(12) United States Patent
Hori et al.

(10) Patent No.: US 11,978,435 B2
(45) Date of Patent: May 7, 2024

(54) LONG-CONTEXT END-TO-END SPEECH RECOGNITION SYSTEM

(71) Applicant: Mitsubishi Electric Research Laboratories, Inc., Cambridge, MA (US)

(72) Inventors: Takaaki Hori, Lexington, MA (US); Niko Moritz, Allston, MA (US); Chiori Hori, Lexington, MA (US); Jonathan Le Roux, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 348 days.

(21) Appl. No.: 17/069,538

(22) Filed: Oct. 13, 2020

(65) Prior Publication Data

US 2022/0115006 A1    Apr. 14, 2022

(51) Int. Cl.
*G10L 15/07*      (2013.01)
*G10L 15/16*      (2006.01)
*G10L 15/22*      (2006.01)

(52) U.S. Cl.
CPC .............. *G10L 15/07* (2013.01); *G10L 15/16* (2013.01); *G10L 15/22* (2013.01); *G10L 2015/223* (2013.01)

(58) Field of Classification Search
None
See application file for complete search history.

(56) References Cited

U.S. PATENT DOCUMENTS

| 6,029,124 | A * | 2/2000 | Gillick | G10L 15/08 |
| | | | | 704/E17.011 |
| 9,836,671 | B2 * | 12/2017 | Gao | G06F 18/22 |
| 10,573,312 | B1 * | 2/2020 | Thomson | G10L 15/22 |
| 2004/0186819 | A1 * | 9/2004 | Baker | H04M 3/4931 |
| | | | | 704/E15.04 |
| 2010/0324901 | A1 * | 12/2010 | Carter | G10L 15/065 |
| | | | | 704/255 |
| 2014/0025380 | A1 * | 1/2014 | Koch | G10L 15/30 |
| | | | | 704/E15.005 |

(Continued)

FOREIGN PATENT DOCUMENTS

WO    WO-2022030805 A1 *   2/2022

*Primary Examiner* — Seong-Ah A Shin
(74) *Attorney, Agent, or Firm* — Gene Vinokur; Hironori Tsukamoto

(57) ABSTRACT

This invention relates generally to speech processing and more particularly to end-to-end automatic speech recognition (ASR) that utilizes long contextual information. Some embodiments of the invention provide a system and a method for end-to-end ASR suitable for recognizing long audio recordings such as lecture and conversational speeches. This disclosure includes a Transformer-based ASR system that utilizes contextual information, wherein the Transformer accepts multiple utterances at the same time and predicts transcript for the last utterance. This is repeated in a sliding-window fashion with one-utterance shifts to recognize the entire recording. In addition, some embodiments of the present invention may use acoustic and/or text features obtained from only the previous utterances spoken by the same speaker as the last utterance when the long audio recording includes multiple speakers.

19 Claims, 9 Drawing Sheets

(56) References Cited

U.S. PATENT DOCUMENTS

| | | | |
|---|---|---|---|
| 2014/0372120 A1* | 12/2014 | Harsham | G10L 15/08 |
| | | | 704/251 |
| 2017/0221474 A1* | 8/2017 | Hori | G10L 15/08 |
| 2019/0130897 A1* | 5/2019 | Zhou | G06N 7/01 |
| 2019/0362229 A1* | 11/2019 | Norouzi | G06N 3/08 |
| 2020/0043483 A1* | 2/2020 | Prabhavalkar | G10L 15/22 |
| 2020/0104371 A1* | 4/2020 | Ma | G06F 40/42 |
| 2020/0175987 A1* | 6/2020 | Thomson | G10L 15/26 |
| 2021/0335364 A1* | 10/2021 | Shirai | G10L 21/003 |
| 2021/0350786 A1* | 11/2021 | Chen | G10L 15/063 |
| 2022/0199094 A1* | 6/2022 | El Shafey | G10L 15/16 |

\* cited by examiner

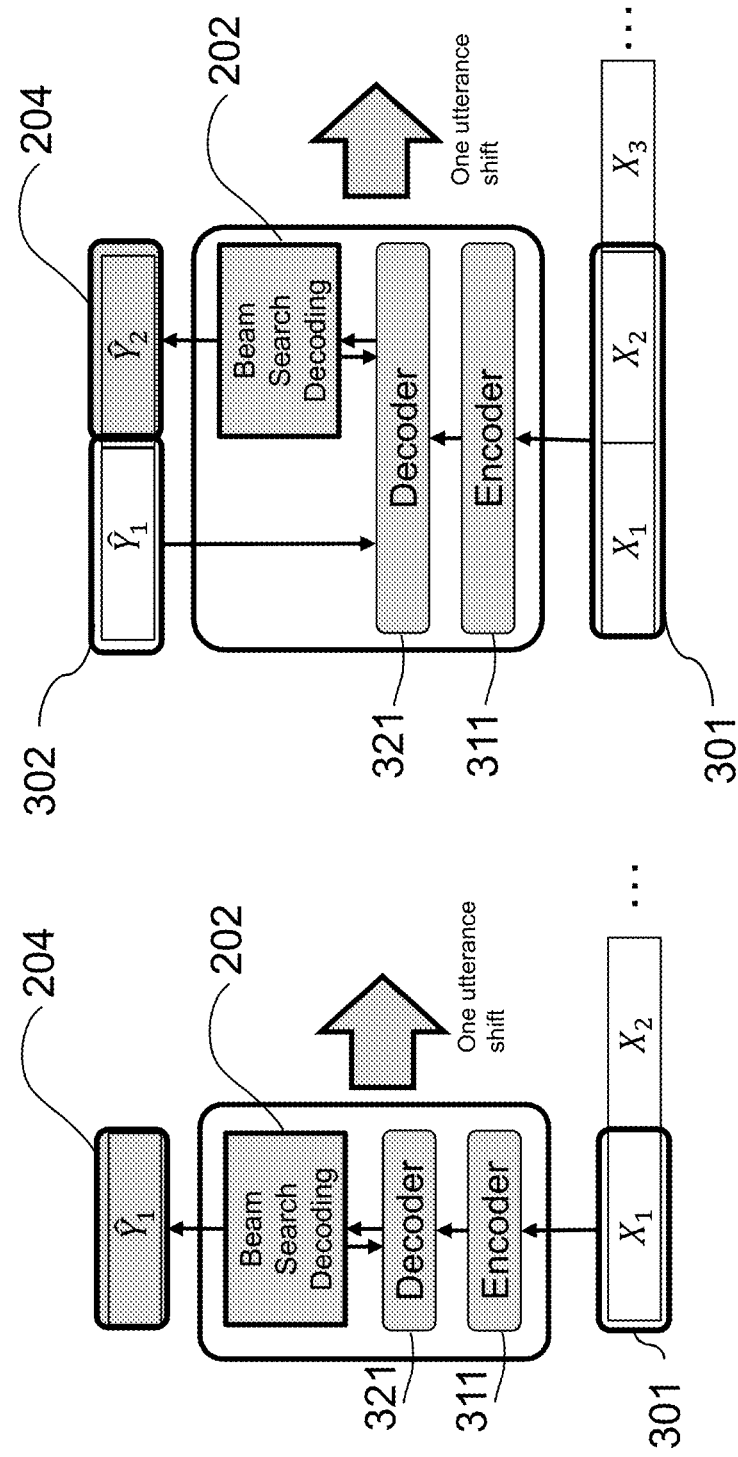

Monologue ASR results. Numbers indicate character error rates [%] for CSJ and word error rates [%] for TED-LIUM3.

|  | CSJ | | | TED-LIUM3 | |
| --- | --- | --- | --- | --- | --- |
|  | eval1 | eval2 | eval3 | dev | test |
| Prior art | 6.0 | 4.2 | 4.7 | 11.9 | 8.7 |
| Prior art + i-vector | 5.9 | 4.1 | 4.9 | 11.2 | 8.6 |
| This invention | 5.5 | 3.8 | 4.0 | 10.5 | 8.1 |

FIG. 7A

Dialogue ASR results. Numbers indicate word error rates [%] for SWITCHBOARD and character error rates [%] for HKUST.

| | context | SWITCHBOARD | | HKUST | |
|---|---|---|---|---|---|
| | | callhm | swbd | train_dev | dev |
| Prior art | n/a | 17.7 | 8.9 | 23.9 | 23.6 |
| Prior art + i-vector | SD | 17.8 | 8.8 | - | - |
| This invention | SI | 15.6 | 8.4 | 22.8 | 22.5 |
| This invention | SD | 15.3 | 8.3 | 22.2 | 21.5 |

FIG. 7B

LONG-CONTEXT END-TO-END SPEECH RECOGNITION SYSTEM

TECHNICAL FIELD

This invention relates generally to speech processing and more particularly to end-to-end automatic speech recognition (ASR) that utilizes long contextual information.

BACKGROUND

Recent advancement of deep learning technology has opened a new paradigm for automatic speech recognition (ASR), the so-called end-to-end ASR, which consists in training and using a single deep network that directly converts speech signal or spectral features into target text. Unlike typical hybrid ASR systems, end-to-end systems rely only on paired acoustic and language data, i.e., training data, without relying on linguistic knowledge, and the whole system is trained using a single algorithm. This approach makes it thus feasible to build ASR systems without expert knowledge. Several end-to-end models have been proposed and applied to ASR, such as connectionist temporal classification (CTC), attention-based encoder decoder (AED), Recurrent Neural Network (RNN) Transducer (RNN-T), Transformer, and their combinations. Specifically, the Transformer has recently provided significant performance gain over RNN-based end-to-end models, e.g., AED and RNN-T, in most major sequence-to-sequence tasks including machine translation and ASR. Therefore, Transformer-based approaches are being studied with increasing attention to further improve ASR accuracy.

On the other hand, ASR systems are plagued by diversities of speakers and topics. Recognition accuracy is typically not high for speakers who have different characteristics from those commonly observed in the training data. The accuracy is also not high for utterances with uncommon topics in the training data. This is because ASR systems are trained to improve the accuracy for the training data and therefore they are not good at recognizing utterances with uncommon or unseen characteristics in the training data.

To overcome this issue, prior methods extract a speaker vector or a topic vector as contextual information from previous utterances spoken by the same speaker or with the same topic as that of the current utterance, and feed it to a neural network for ASR together with the speech signal of the current utterance. With the speaker or topic vector, the network is adapted to the current speaker or topic, and the recognition accuracy improves. However, such prior methods summarize the information of previous utterances into a single fixed-dimensional vector, and therefore the vector may not preserve sufficient information of the previous utterances. Generally, a fixed-dimensional vector is insufficient to represent sequential pattern of acoustic or language features over multiple utterances. This potentially hinders better speaker/topic adaptation of the network.

As mentioned above, there are some prior studies on incorporating contextual information in end-to-end ASR. For example, a speaker vector is fed to the encoder network of AED together with speech features, and a topic vector is fed to the decoder network of AED. However, no effective method has been known yet for Transformer-based ASR systems. Therefore, the ASR systems cannot take advantage of contextual information to recognize long speeches. Moreover, unlike prior methods, it is desirable to exploit the contextual information without summarizing it into a fixed-dimensional vector.

SUMMARY

An object of some embodiments of the invention is to provide a system and a method for end-to-end ASR suitable for recognizing long audio recordings such as lecture and conversational speeches.

This disclosure includes a long-context end-to-end ASR system that utilizes contextual information, wherein a context-expanded Transformer accepts multiple utterances at the same time and predicts text transcript for the last utterance. This is repeated in a sliding-window fashion with one-utterance shifts to recognize long audio recordings. The context-expanded Transformer exploits contextual information in training and decoding to improve the recognition accuracy for long audio recordings such as lecture and conversational speeches.

The present invention includes steps for making a speech segment consisting of concatenated multiple utterances and steps for training a context-expanded Transformer to minimize a loss function for the last utterance of the speech segment, wherein the previous utterances are used to adapt hidden vectors representing acoustic and language features at every encoder/decoder layer of the Transformer for recognizing the last utterance in the speech segment. Unlike prior methods that summarize the information of previous utterances into a single fixed-dimensional vector, the present invention uses the previous utterances directly to adapt the hidden vectors through a self-attention mechanism of the Transformer without losing the information. The invention provides better-adapted hidden vectors, and therefore improves the speech recognition accuracy.

The invention also includes steps for decoding a long audio, which repeat (1) updating the speech segment by appending the next utterance to the segment based on a sliding-window technique, (2) decode the last utterance of the updated speech segment using the context-expanded Transformer, and (3) stop decoding when the next utterance does not exist in the long audio.

In addition, some embodiments of the present invention may use acoustic and/or language features obtained from only the previous utterances spoken by the same speaker as the last utterance when the long audio recording includes multiple speakers.

Further, some embodiments of the present invention provide an end-to-end automatic speech recognition (ASR) system. The ASR system may include an interface configured to acquire acoustic feature sequence including utterances; a memory configured to store computer-executable ASR program modules including a context-expanded transformer network including an encoder network and a decoder network, a beam search decoder and a speech-segment update module; a processor, in connection with the memory, configured to repeatedly decode the utterances. The professor is configured to perform steps of arranging speech and text segments using the acoustic feature sequence and a token sequence provided from the beam search decoder; updating the speech segment by appending the acoustic feature sequence to a last of the speech segment and updating the text segment by appending a token sequence of the recognition result for a previous utterance to a last of the text segment; receiving the updated speech segment, the updated text segment and a partial token sequence from the beam search decoder; estimating token probabilities for the beam search decoder based on the speech and text segments; and finding a most probable token sequence as a speech recognition result from the estimated token probabilities using the beam search decoder.

Yet another embodiment of the present invention provides an end-to-end automatic speech recognition method. The method comprises steps of acquiring acoustic feature sequence including utterances; arranging speech and text segments using the acoustic feature sequence and a token sequence provided from the beam search decoder; updating the speech segment by appending the acoustic feature sequence to a last of the speech segment and updating the text segment by appending a token sequence of the recognition result for a previous utterance to a last of the text segment; receiving the updated speech segment, the updated text segment and a partial token sequence from the beam search decoder; estimating token probabilities for the beam search decoder based on the speech and text segments; finding a most probable token sequence as a speech recognition result from the estimated token probabilities using the beam search decoder; and generating text data based on the most probable token sequence.

Further, another embodiment of the present invention provides a non-transitory computer readable medium that comprises program instructions that causes a computer to perform an end-to-end automatic speech recognition method. The method includes acquiring acoustic feature sequence including utterances; arranging speech and text segments using the acoustic feature sequence and a token sequence provided from the beam search decoder; updating the speech segment by appending the acoustic feature sequence to a last of the speech segment and updating the text segment by appending a token sequence of the recognition result for a previous utterance to a last of the text segment; receiving the updated speech segment, the updated text segment and a partial token sequence from the beam search decoder;

estimating token probabilities for the beam search decoder based on the speech and text segments; finding a most probable token sequence as a speech recognition result from the estimated token probabilities using the beam search decoder; and generating text data based on the most probable token sequence.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIGS. 6A, 6B, and 6C are schematic diagrams illustrating some steps of the long-context end-to-end ASR system with a context-expanded Transformer, according to embodiments of the present invention;

FIG. 7A shows monologue ASR results on CSJ and TED-LIUM3 data sets, according to embodiments of the present invention; and FIG. 7B shows dialogue ASR results on SWITCHBOARD and HKUST data sets, according to embodiments of the present invention.

Figure 1:
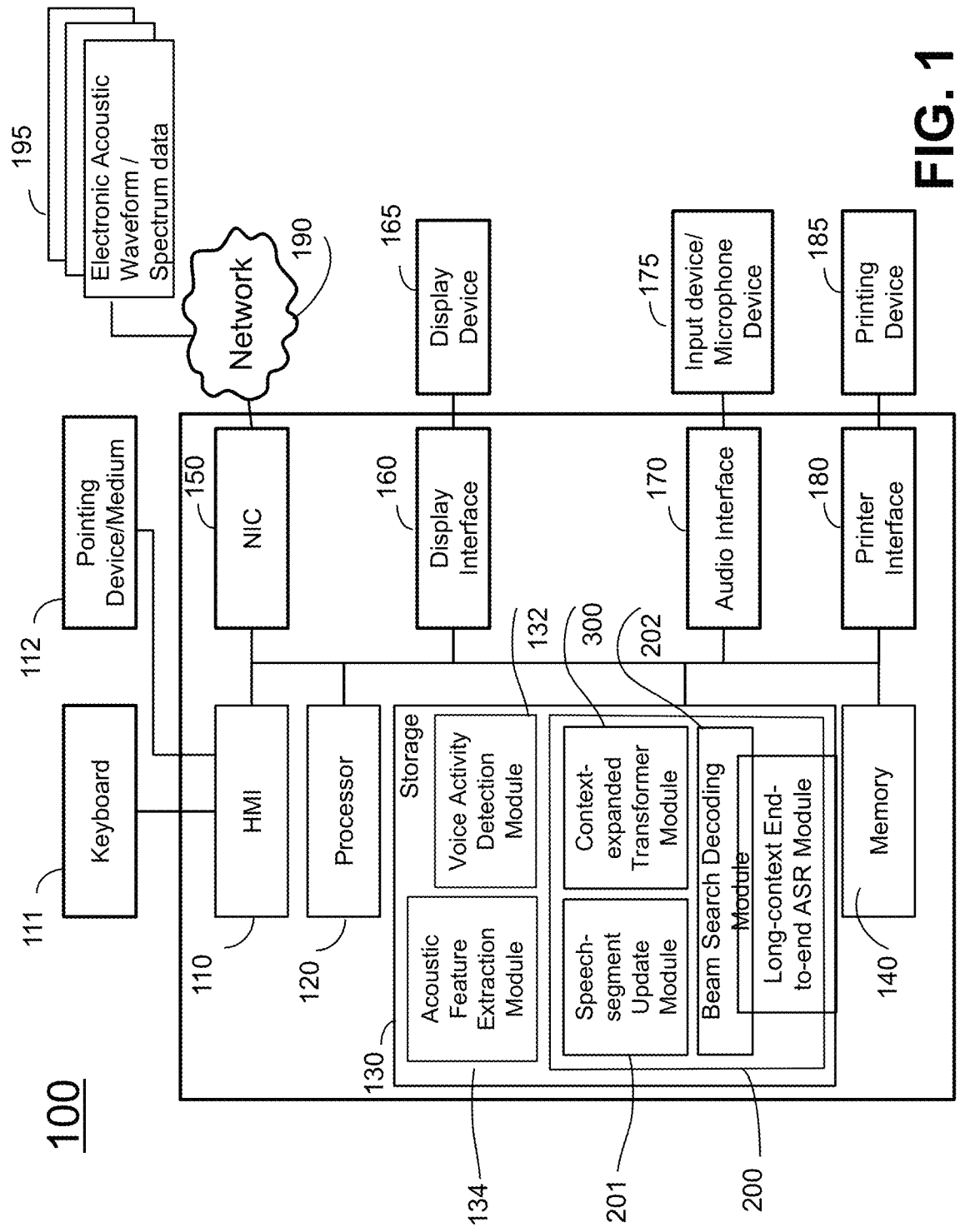
FIG. 1 is a block diagram illustrating a long-context end-to-end ASR system, according to embodiments of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Modules and networks exemplified in the present disclosure may be computer programs, software or instruction codes, which can execute instructions using one or more processors. Modules and networks may be stored in one or more storage devices or otherwise stored into computer readable media such as storage media, computer storage media, or data storage devices (removable and/or non-removable) such as, for example, magnetic disks, optical disks, or tape, in which the computer readable media are accessible from the one or more processors to execute the instructions.

Computer storage media may include volatile and non-volatile, removable and non-removable media implemented in any method or technology for storage of information, such as computer readable instructions, data structures, program modules, or other data. Computer storage media may be RAM, ROM, EEPROM or flash memory, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both using one or more processors. Any such computer storage media may be part of the device or accessible or connectable thereto. Any application or module herein described may be implemented using computer readable/executable instructions that may be stored or otherwise held by such computer readable media.

Long-Context End-to-End ASR System 100

FIG. 1 shows a block diagram of a long-context end-to-end ASR system (ASR system) 100 according to some embodiments of the invention. The ASR system 100 may include a human machine interface (HMI) 110 connectable with a keyboard 111 and a pointing device/medium 112, one or more processor 120, a storage device 130, a memory 140, a network interface controller 150 (NIC) connectable with a network 190 including local area networks and internet network, a display interface 160, an audio interface 170 connectable with an input device/a microphone device 175, a printer interface 180 connectable with a printing device 185. The memory 140 may be one or more memory units. The ASR system 100 can receive electric audio waveform/spectrum data 195 via the network 190 connected to the NIC 150. The storage device 130 includes a long-context end-to-end ASR module 200, a context-expanded Transformer module 300, a speech-segment update module 201, a beam search decoding module 202, a voice activity detection (VAD) module 132, and an acoustic feature extraction module 134. The pointing device/medium 112 may include modules that read programs stored on a computer readable recording medium. The context-expanded Transformer module 300 may be formed by neural network parameters.

The VAD module 132 is a program used to extract spoken utterances from electronic acoustic waveforms of 195 or those received from the microphone device 175 via the audio interface 170. The VAD module 132 may extract spoken utterances by detecting the start and end positions of each utterance in a given waveform and cutting out each utterance from the waveform according to the start and end positions. The start and end positions may be decided based on the signal power, zero-crossing frequency, and/or frequency pattern of the waveform. If the given waveform is already an utterance, which may be extracted manually by pushing a button or automatically obtained by other devices or computers (not shown), the VAD module 132 may not be included.

The acoustic feature extraction module 134 is a program used to extract an acoustic feature sequence from each utterance determined by the VAD module 132. The acoustic feature sequence may be a sequence of mel-scale filterbank coefficients with their first and second order temporal derivatives and/or pitch features.

For performing the long-context end-to-end ASR, instructions may be transmitted to the long-context end-to-end ASR system 100 using the keyboard 111, the pointing device/medium 112 or via the network 190 connected to other computers (not shown in the figure). The system 100 receives instructions via the HMI 110 and executes the instructions for performing long-context end-to-end ASR using the processor 120 in connection with the memory 140 by loading the long-context end-to-end ASR module 200, the speech segment update module 201, the beam search decoding module 202, the context-expanded Transformer module 300, and the acoustic feature extraction module 134 stored in the storage device 130.

The long-context end-to-end ASR module 200 outputs a token sequence as recognition result for a given acoustic feature sequence, and sends the token sequence to the display device 165 via the display interface 160, the printer device 185 via the printer interface 180, or other computers (not shown in the figure) via the network 190. The network 190 may be a wireless network or wire network. Further the network 190 may be connected to an internet network. Each token in the token sequence may be a single word, a single letter, a single character, or a word piece in a text form.

Long-Context End-to-End ASR Module 200

Figure 2:
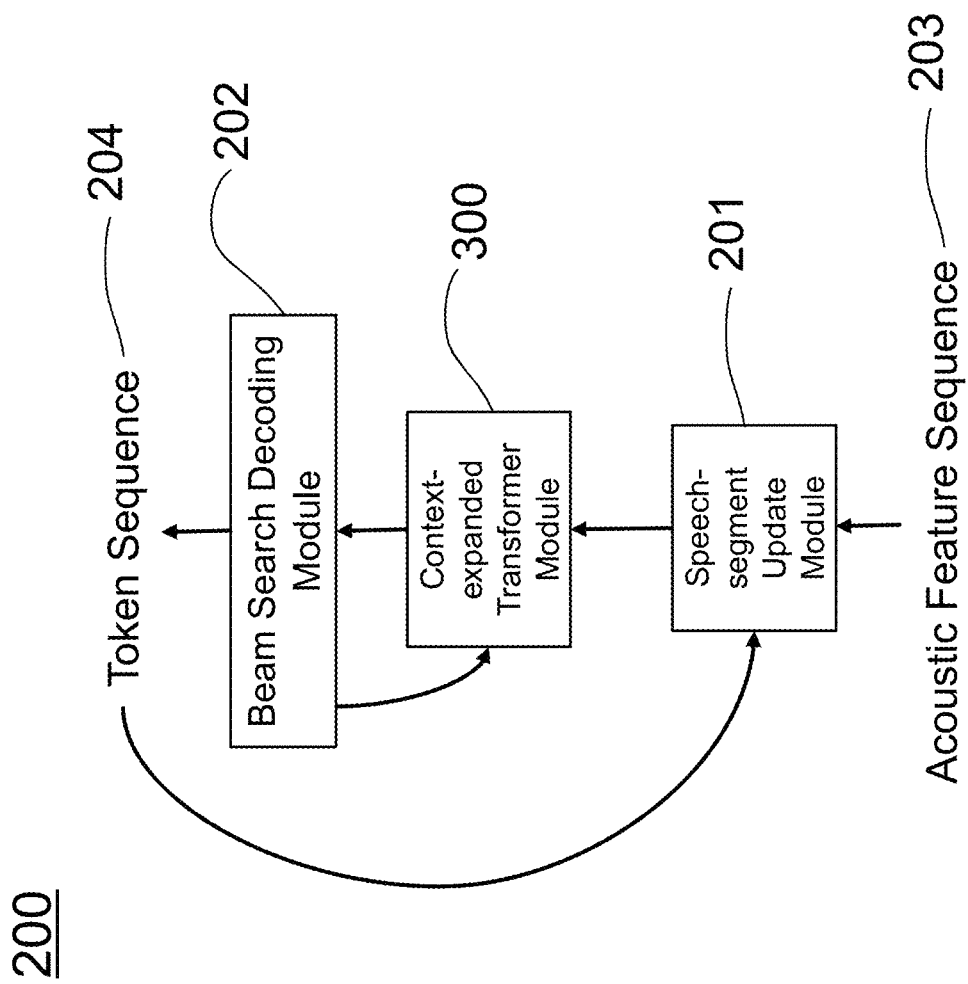
FIG. 2 is a block diagram illustrating a context-expanded Transformer, according to embodiments of the present invention.

FIG. 2 shows a block diagram of a long-context end-to-end ASR module (ASR module) 200 according to some embodiments of the invention. A speech-segment update module 201 arranges speech and text segments using an acoustic feature sequence 203 and a token sequence 204, where the token sequence 204 is given by a beam search decoding module (beam search decoder) 202. A context-expanded Transformer module 300 receives the speech and text segments from the speech-segment update module 201 and outputs/generates token probabilities for the beam search decoding module 202. The decoding module 202 finds the most probable token sequence based on the token probabilities, wherein the beam search decoding module 202 sends a partial token sequence hypothesized in the beam search process of the beam search decoding module 202 to the Transformer module 300 to receive the probabilities for the next token of the partial token sequence from the Transformer module 300.

The speech-segment update module 201 updates a speech segment by appending the acoustic feature sequence 203 to the last of the speech segment. The speech segment may be an acoustic feature sequence including one or more utterances. At the initial stage, the speech segment may be an empty sequence. To avoid making the speech segment too long, the segment may be shortened by removing oldest utterance(s) from the segment if the length of the segment exceeds a predetermined threshold by appending the acoustic feature sequence 203. The length may be decided by the duration of the segment or the number of acoustic features in the segment. The speech-segment update module 201 also arranges a text segment including a token sequence. The text segment may be updated by appending the token sequence 204 to the last of the text segment, wherein the token sequence 204 is obtained from the beam search decoding module 202 as a recognition result for the previous utterance. At the initial stage, the text segment may be an empty sequence. The text segment may also be shortened by removing oldest tokens according to the same manner that the speech segment is shortened. The speech-segment update module 201 outputs the updated speech and text segments to the context-expanded Transformer module 300.

Speech-Segment Update Module 201

Speech-segment update module 201 as an embodiment of this invention may be performed as follows. Let be $X_u$ and $Y_u$ be an acoustic feature sequence and a token sequence for the u-th utterance in a long audio recording, respectively, where $1 \leq u \leq U$ and U is the number of the utterances in the audio recording. The acoustic feature sequence $X_u$ is a sequence of $d_a$-dimensional vectors with length $T_u$, i.e., $X_u = x_{u,1}, \ldots, x_{u,t}, \ldots, x_{u,T_u}$, where $x_{u,t} \in \mathbb{R}^{d_a}$. The token sequence $Y_u$ is a sequence of tokens with length $M_u$, i.e., $Y_u = Y_{u,1}, \ldots, Y_{u,m}, \ldots, Y_{u,m_u}$, where $Y_{u,m} \in V$ for vocabulary V, a set of tokens defined for the system. In this disclosure, a sequence is sometimes denoted with a range of indices, for example, a sequence of utterances $X_v, \ldots, X_u$ is also written as $X_{v:u}$.

The speech-segment update module 201 includes a speech segment $S_X$ and a text segment $S_Y$, which are initialized with an empty sequence (referred to as an initial stage) before processing the long audio recording. Given an acoustic feature sequence $X_u$, the speech-segment update module 201 updates speech segment $S_X$ by appending $X_u$, i.e., $S_X \leftarrow S_X X_u$. The update module 201 also receives $Y_{u-1}$ from the beam search decoding module 202, and updates text segment $S_Y$ by appending $Y_{u-1}$, i.e., $S_Y \leftarrow S_Y Y_{u-1}$. Note that $Y_{u-1}$ is the ASR result obtained for $X_{u-1}$, which is the acoustic feature sequence for the previous utterance.

The speech segment $S_X$ may be shortened if the segment length $|S_X|$ is greater than a predetermined threshold $\Gamma$. Assuming $S_X = X_{v:u}$ such that $1 \leq v < u$, $S_X$ may be shortened as $$S_X \leftarrow \begin{cases} X_{v':u} & \text{if } |X_{v:u}| > \Gamma \\ X_{v:u} & \text{otherwise} \end{cases} \quad (1)$$

where v' is the minimum index that satisfies $v < v' \leq u$ and $|X_{v':u}| \leq \Gamma$. The segment length is computed as $|X_{v:u}| = \Sigma_{i=v}^{u} T_i$. The text segment $S_Y$ may also be shortened as $S_Y \leftarrow Y_{v':u-1}$ to be consistent with the speech segment.

Context-Expanded Transformer 300

Figure 3:
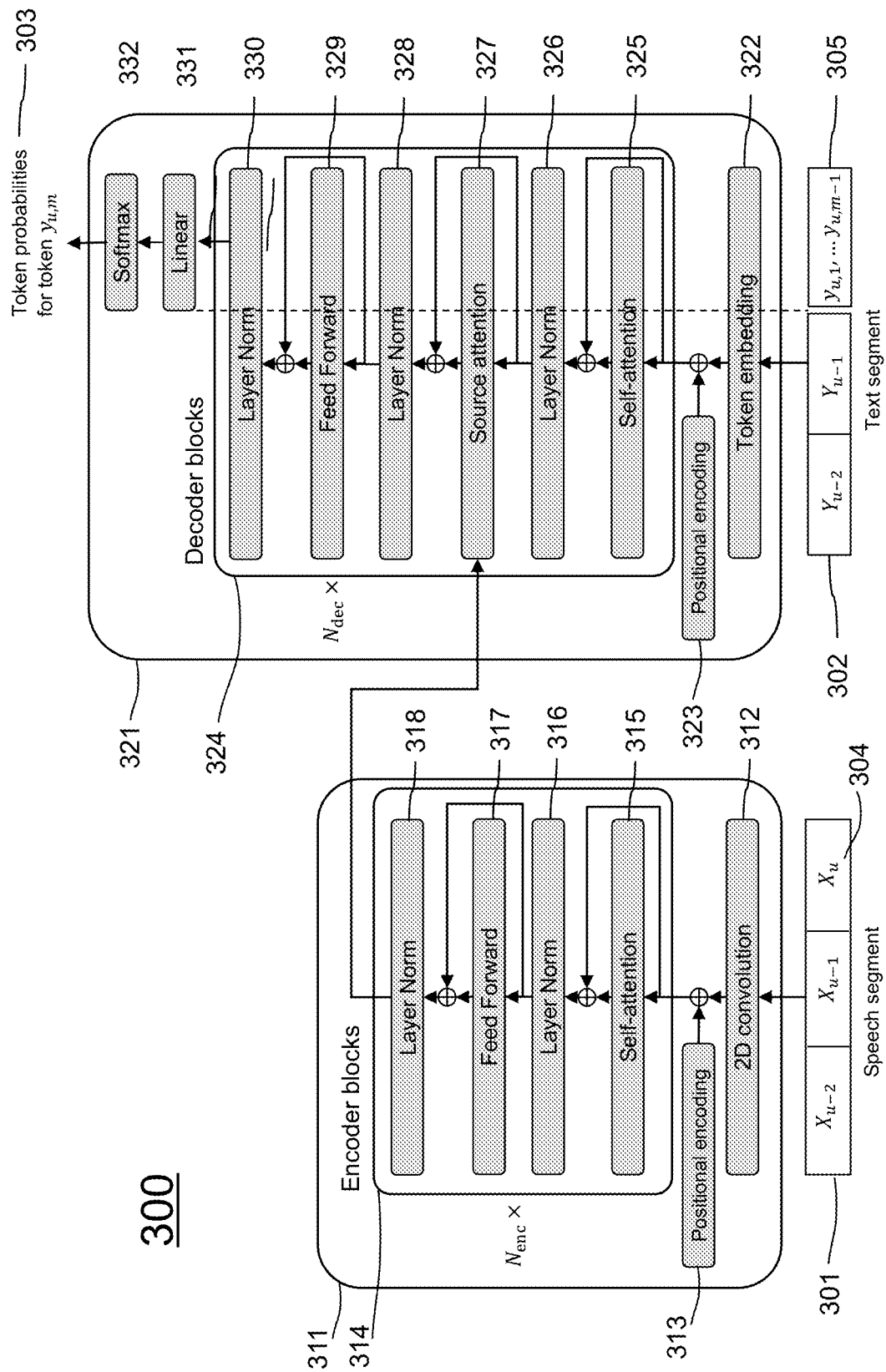
FIG. 3 is a schematic diagram illustrating a speech recognition process for the first utterance using a context-expanded Transformer, according to embodiments of the present invention.

FIG. 3 illustrates a context-expanded Transformer module 300 as an embodiment of this invention. The network architecture is similar to a conventional Transformer of prior art, which includes an encoder, a decoder, and self-attention layers. The conventional Transformer of prior art basically/merely accepts only a single utterance at once, and predicts token probabilities for the single utterance, where no contextual information is used.

On the contrary, the context-expanded Transformer of the present invention is configured to accept a speech segment 301 and a text segment 302 including multiple utterances, and predict token probabilities 303 for the last utterance of the speech segment 304, where the acoustic feature sequence excluding the last utterance in the speech segment and the token sequence of the text segment are used as contextual information to adapt hidden vectors in the Transformer module 300.

The context-expanded Transformer module 300 receives a speech segment 301 and a text segment 302 from a speech-segment update module 201, and also receives a partial token sequence 305 from a beam search decoding module 202. From these input sequences, the Transformer module 300 estimates token probabilities 303. The token probabilities 303 are used in the beam search decoding module 202 to find the most probable token sequence as a speech recognition result for the last utterance 304.

The goal of the long-context end-to-end ASR according to the present invention is to find the most probable token sequence $\hat{Y}_u$ for speech and text segments $X_{v:u}$ and $Y_{v:u-1}$ as $$\hat{Y}_u = \text{argmax}_{Y_u \in V^*} p(Y_u | Y_{v:u-1}, X_{v:u}) \quad (2)$$

$$= \text{argmax}_{Y_u = y_{u,1:M_u} \in V^*} \prod_{m=1}^{M} p(y_{u,m} | Y_{v:u-1}, y_{u,1:m-1}, X_{v:u}),$$

where the probability $p(y_{u,m}|Y_{v:u-1}, y_{u,1:m-1}, X_{v:u})$ in Eq. (2) is computed using the context-expanded Transformer module 300.

The context-expanded Transformer module 300 includes an encoder 311 and a decoder 321. The encoder 311 first applies a 2D convolution (Conv2D) 312 to speech segment $X_{v:u}$ 301. In FIG. 3, it is assumed to be $X_{v:u} = X_{u-2:u}$, i.e., $v = u-2$.

The Conv2D 312 computes a hidden vector sequence as $$H_{v:u}^{conv} = \text{Conv2D}(X_{v:u}) = \text{ReLU}(W^{conv} * X_{v:u} + b^{conv}), \quad (3)$$

where $H_{v:u}^{conv} \in \mathbb{R}^{(|x_{v:u}|/s_t) \times C(d_a/s_f)}$ is the hidden vector sequence, $W^{conv} \in \mathbb{R}^{C \times K_t \times K_f}$ is a convolution weight tensor, $b^{conv} \in \mathbb{R}^{C(d_a/s_f)}$ is a bias vector, "*" represents a convolution operation applied to both time and feature dimensions of $X_{v:u}$, C is the number of channels, $s_t$ and $s_f$ is the sizes of stride for the time and feature dimensions, and $K_t$ and $K_f$ are the kernel sizes of the time and feature dimensions, respectively. ReLU(·) is a rectified linear unit used as an activation function. The Conv2D 312 may be repeated one or more times.

Positional encoding (PosEnc) 313 makes positional encoding vectors for a vector sequence $H \in \mathbb{R}^{L \times d}$ as $$\text{PosEnc}(H) = [PE_1, \ldots, PE_i, \ldots, PE_L], \quad (4)$$

where $PE_i$ is a positional encoding vector at position i, and its 2j-th and (2j+1)-th elements are computed as $$PE_{i,2j} = \sin\left(i/10000^{\frac{2j}{d}}\right) \quad (5)$$

$$PE_{i,2j+1} = \cos\left(i/10000^{\frac{2j}{d}}\right). \quad (6)$$

L is the length of the vector sequence H, and d is the number of dimensions of each column vector in H.

Then, the output of PosEnc 313 for $H_{v:u}^{conv}$ is added to $H_{v:u}^{conv}$ to obtain the first hidden vector sequence $H_{v:u}^0$ as $$H_{v:u}^0 = H_{v:u}^{conv} + \text{PosEnc}(H_{v:u}^{conv}). \quad (7)$$

The encoder 311 has $N_{enc}$ encoder blocks 314, which are stacked vertically, where the first hidden vector $H_{v:u}^0$ is fed to the first encoder block of 314.

Each encoder block has a self-attention layer 315, which is based on a multi-head attention mechanism. A scaled dot-product attention can be computed as $$\text{Attention}(Q, K, V) = \text{softmax}\left(\frac{QK^T}{\sqrt{d_k}}\right)V, \quad (8)$$

where Q is a matrix that packs a sequence of query vectors, K and V are matrices that pack the key and value vectors in a sequence, respectively. $d_k$ is the number of dimensions of each key vector.

The multi-head attention allows the model to jointly attend to the input sequence from different representation subspaces at different positions:

$$MHA(Q,K,V)=\text{Concat}(\text{head}_1, \ldots, \text{head}_M)W^O, \quad (9)$$

where $$\text{head}_i=\text{Attention}(QW_i^Q, KW_i^K, VW_i^V), \quad (10)$$

and the projections are applied by parameter matrices $W_i^Q \in \mathbb{R}^{d_h \times d_k}$, $W_i^K \in \mathbb{R}^{d_h \times d_k}$, $W_i^V \in \mathbb{R}^{d_h \times d_v}$ and $W^O \in \mathbb{R}^{Md_v \times d_h}$. $d_v$ is the number of dimensions of each value vector, $d_h$ is the number of dimensions of each hidden vector in the encoder or decoder, and $d_k=d_v=d_h/M$ in typical Transformer architecture. Concat(·) denotes an operation that concatenates matrices.

The self-attention layer 315 in the n-th encoder block computes multi-head attention for hidden vector sequence $H_{v:u}^{n-1}$ as $MHA(H_{v:u}^{n-1}, H_{v:u}^{n-1}, H_{v:u}^{n-1})$, where the query, key, and value vectors all come from $H_{v:u}^{n-1}$, the hidden vector sequence obtained in the previous encoder block or the Conv2D with PosEnc. Thus, each column vector in $H_{v:u}^{n-1}$ is adapted by the other vectors in $H_{v:u}^{n-1}$ through the attention mechanism.

Then, hidden vector sequence $\overline{H}^n_{v:u}$ is obtained as $$\overline{H}^n_{v:u}=\xi(H_{v:u}^{n-1}+MHA(H_{v:u}^{n-1}, H_{v:u}^{n-1}, H_{v:u}^{n-1})), \quad (11)$$

where $\xi(\cdot)$ represents a layer normalization 316, which applies linear normalization to given vectors using learned mean and standard deviation parameters.

Then, a feed-forward network 317 and another layer normalization 318 are applied to $\overline{H}^n_{v:u}$ as $$H_{v:u}^n=\xi(\overline{H}^n_{v:u}+FFN(\overline{H}^n_{v:u})), \quad (12)$$

where FFN(·) represents the feed-forward network 317. The encoder 311 finally outputs encoder states $H_{v:u}^{N_{enc}}$ as the hidden vector sequence generated by the last encoder block.

Figure 4:
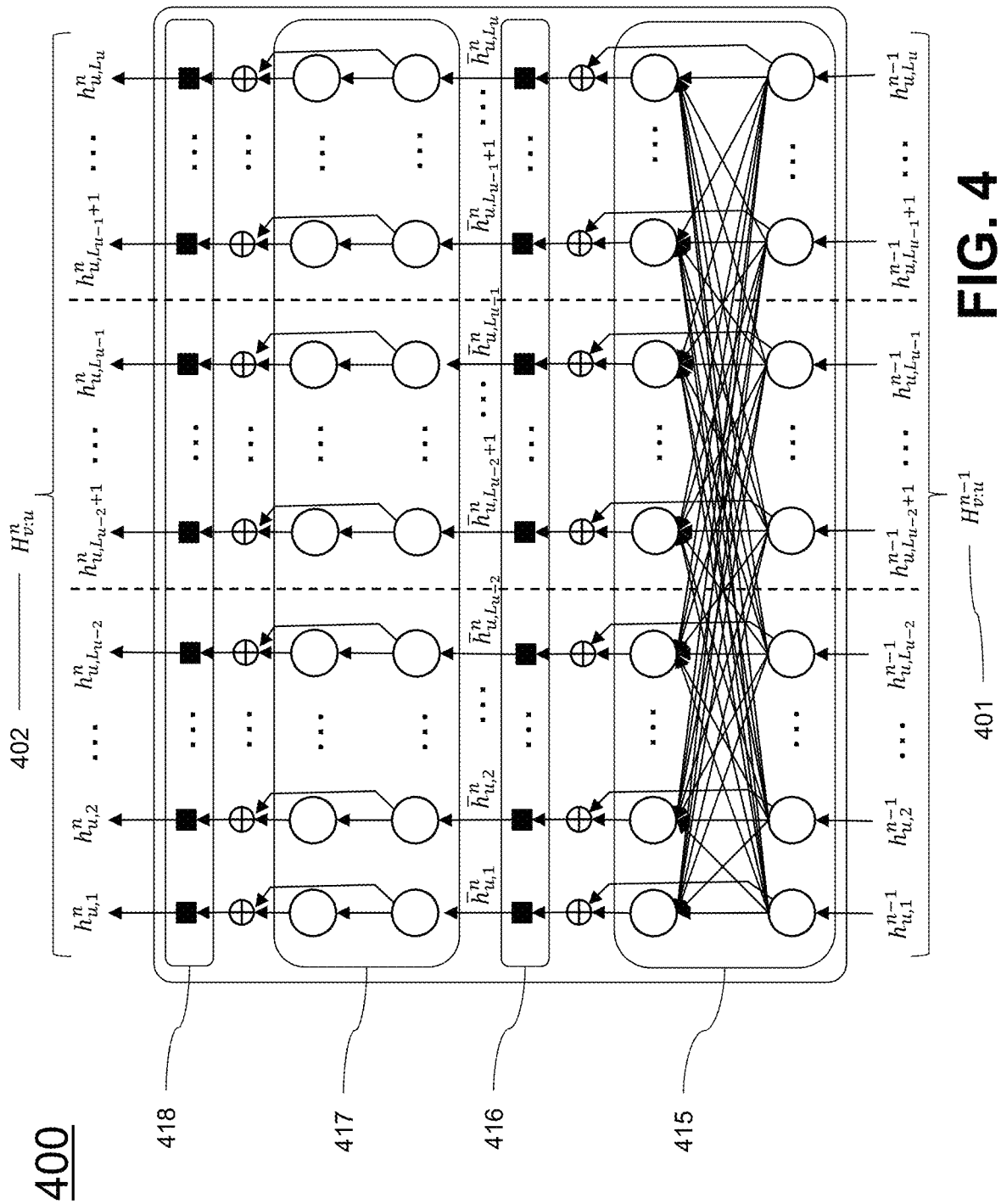
FIG. 4 is a schematic diagram illustrating detailed computation flow in each encoder block, according to embodiments of the present invention.

FIG. 4 illustrates detailed computation flow in each encoder block, where an input hidden vector sequence 401 $H_{v:u}^{n-1}$ to an output hidden vector sequence 402 $H_{v:u}^n$ using self-attention 415, layer normalization 416, feed-forward network 417, and layer normalization 418.

In FIG. 4, $H_{v:u}^{n-1}$, $\overline{H}_{v:u}^n$ and $H_{v:u}^n$ are factorized into hidden vector sequences $h_{u,1}^{n-1}, h_{u,2}^{n-1}, \ldots, h_{u,L_u}^{n-1}, \overline{h}_{u,1}^n, \overline{h}_{u,2}^n, \ldots, \overline{h}_{u,L_u}^n$ and $h_{u,1}^n, h_{u,2}^n, \ldots, h_{u,L_u}^n$, respectively.

Self-attention 415 performs self-attention of Eq. (11), wherein each hidden vector of $\overline{H}_{v:u}^n$-IL is obtained through a weighted sum of all hidden vectors of $H_{v:u}^{n-1}$ over multiple utterances of the segment, which enables to adapt each hidden vector to the speaker of the segment.

The decoder 321 in FIG. 3 accepts a text segment $Y_{v:u-1}$, a partial token sequence $y_{u,1:i-1}$, and the encoder states $H_{v:u}^{N_{enc}}$, and estimates the probability distribution of $y_{u,i}$ in Eq. (2). The text segment $Y_{v:u-1}$ is extended by appending the partial token sequence $y_{u,1:i-1}$, and the extended text segment is written as $y'_{u,1:k-1}$, which represents all previous tokens up to index k−1, where $|Y_{v:u:k-1}|<k\leq|Y_{v:u}|$ and $k=|Y_{v:u-1}|+i$. $|Y^*|$ denotes the number of tokens in sequence $Y^*$.

The decoder 321 first applies token embedding and positional encoding as $$g_{u,1:k-1}^0=\text{Embed}(Y'_{u,1:k-1})+\text{PosEnc}(y'_{u,1:k-1}), \quad (13)$$

where Embed(·) represents the token embedding, which converts each token into a $d_d$-dimensional vector. Next, the decoder computes hidden vector $g_{u,k-1}^n$ in each n-th decoder block 324 as $$\overline{g}_{u,k-1}^n = \xi(g_{u,k-1}^{n-1} + MHA(g_{u,k-1}^{n-1}, g_{u,1:k-1}^{n-1}, g_{u,1:k-1}^{n-1})) \quad (14)$$

$$\overline{\overline{g}}_{u,k-1}^n = \xi(\overline{g}_{u,k-1}^n + MHA(\overline{g}_{u,k-1}^n, H_{v:u}^{N_{enc}}, H_{v:u}^{N_{enc}})) \quad (15)$$

$$g_{u,k-1}^n = \xi(\overline{\overline{g}}_{u,k-1}^n + FFN(\overline{\overline{g}}_{u,k-1}^n)), \quad (16)$$

and outputs the decoder states from the last decoder block, i.e., $g_{u,k-1}^{N_{dec}}$, where $N_{dec}$ denotes the number of decoder blocks. Eq. (14) applies self-attention 325 and layer normalization 326. Eq. (15) applies source attention 327 over the encoder states $H_{v:u}^{N_{enc}}$, in which $\overline{g}_{u,k-1}^n$ is used for the query vector, and then applies layer normalization 328. Eq. (16) applies a feed forward network 329 and layer normalization 330. Finally, we obtain the Transformer token probability distribution by applying a linear transformation 331 and a softmax function 332 as $$p(y_{u,i}|Y_{v:u-1}, y_{u,1:i-1}, X_{v:u}) = \text{Softmax}(\text{Linear}(g_{u,|y_{v:u-1}|+i-1}^{N_{dec}})). \quad (17)$$

Figure 5:
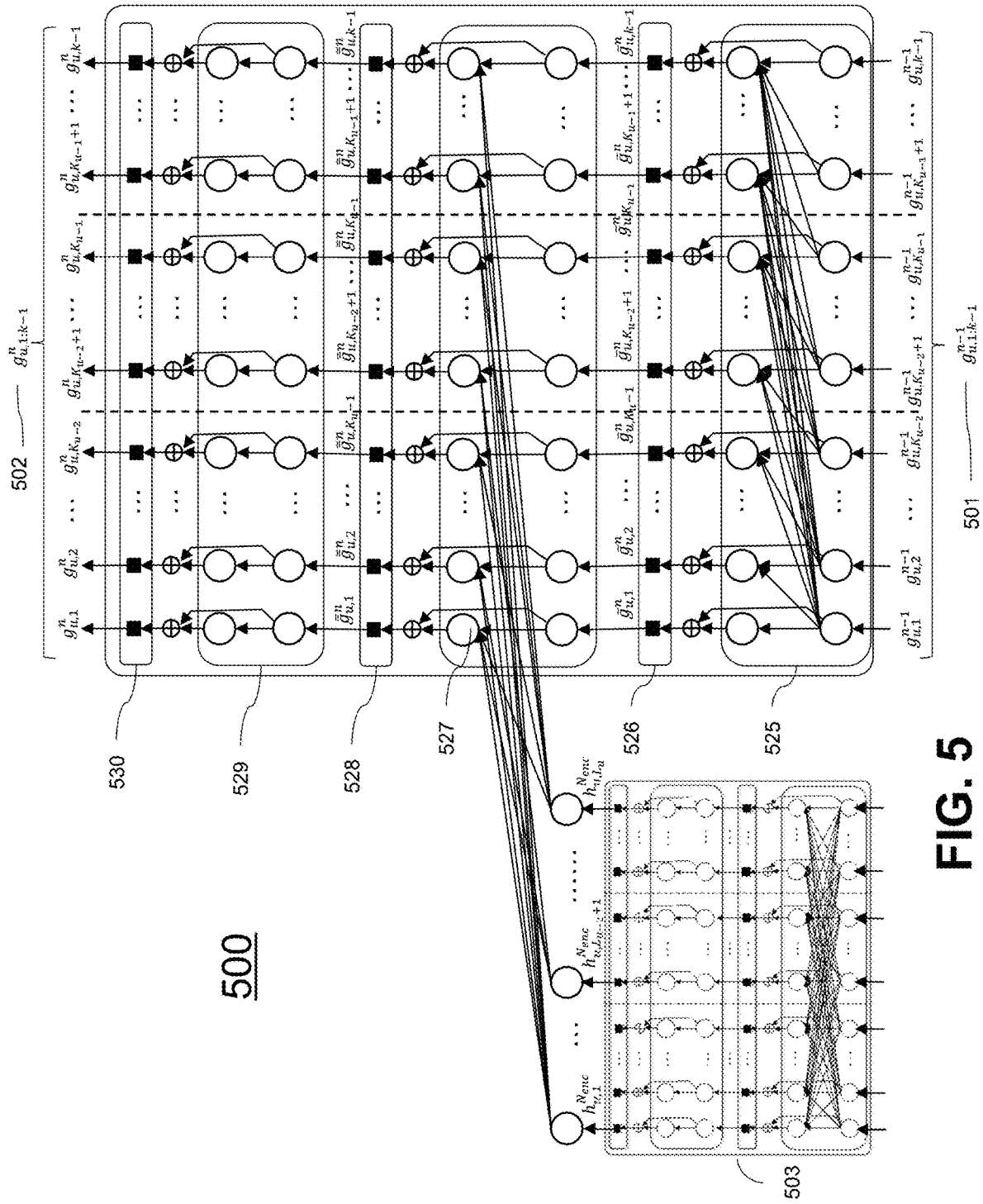
FIG. 5 is a schematic diagram illustrating detailed computation flow in each decoder block, according to embodiments of the present invention.

FIG. 5 illustrates detailed computation flow in each decoder block 500, where an input hidden vector sequence 501 $g_{u,1:k-1}^{n-1}$ to an output hidden vector sequence 502 $g_{u,1:k-1}^n$ using self-attention 525, layer normalization 526, source attention 527, layer normalization 528, feed-forward network 529, and layer normalization 530.

In FIG. 5, self-attention 525 performs self-attention of Eq. (14), where each hidden vector of $g_{u,1:k-1}^n$ is obtained through a weighted sum of all hidden vectors of $g_{u,1:k-1}^{n-1}$ over multiple utterances in the text segment, which enables to adapt each hidden vector to the topic of the text segment. Source attention 527 performs source attention of Eq. (15), which accepts an encoded speech segment from the last encoder block 503, where the hidden vector sequence of the encoded segment over multiple utterances is used to adapt the hidden vector sequence $\overline{g}_{u,1:k-1}^n$ of the decoder.

Beam Search Decoding Module 202

The beam search decoding module 202 finds the most probable token sequence based on Eq. (2), where the token probability $p(y_{u,i}|Y_{v:u-1}, y_{u,1:i-1}, X_{v:u})$ is given by the context-expanded Transformer module 300.

The beam search decoding module 202 of the present invention finds the most probable token sequence $\hat{Y}_u$ in Eq. (2). However, it is difficult to enumerate all possible token sequences for $Y_u$ and compute $p(Y_u|Y_{v:u-1}, X_{v:u})=\prod_{m=1}^{M_u} p(y_{u,m}|Y_{v:u-1}, y_{u,1:m-1}, X_{v:u})$, because the number of possible token sequences increases exponentially to the length of the sequence. Therefore, a beam search technique is usually used to find $\hat{Y}_u$, in which shorter token sequence hypotheses are generated first, and only a limited number of hypotheses, which have a higher score than others, are extended to obtain longer hypotheses. Finally, the best token sequence hypothesis is selected in the complete hypotheses that reached the end of the sequence.

The beam search decoding module 202 finds $\hat{Y}_u$ as follows. Let $\Omega_l$ be a set of partial hypotheses of the length l. At the beginning of the beam search, $\Omega_0$ contains only one hypothesis with the starting token <sos>, and its score α(<sos>) is set to 0. For l=1 to $L_{max}$, each partial hypothesis in $\Omega_{l-1}$ is expanded by appending possible single tokens, and the new hypotheses are stored in $\Omega_l$, where $L_{max}$ is the maximum length of the hypotheses to be searched. The score of each new hypothesis is computed in the log domain as $$i \cdot \alpha(h) = \alpha(g) + \log p(y|Y_{v:u-1}, g, X_{v:u}), \tag{18}$$

where g is a partial hypothesis in $\Omega_{l-1}$, y is a single token appended to g, and h is the new hypothesis, i.e. h=g·y. The probability $p(y|Y_{v:u-1}, g, X_{v:u})$ can be computed by Eq. (17).

If y is a special token that represents the end of a sequence <eos>, h is added to $\hat{\Omega}$ but not $\Omega_l$, where $\hat{\Omega}$ denotes a set of complete hypotheses.

Finally, $\hat{Y}_u$ is obtained as $$\hat{Y}_u = \underset{h \in \hat{\Omega}}{\operatorname{argmax}} \ \alpha(h). \tag{19}$$

In the beam search process, $\Omega_l$ is allowed to hold only a limited number of hypotheses with higher scores, and the other hypotheses are pruned to improve the search efficiency.

Figure 6C:
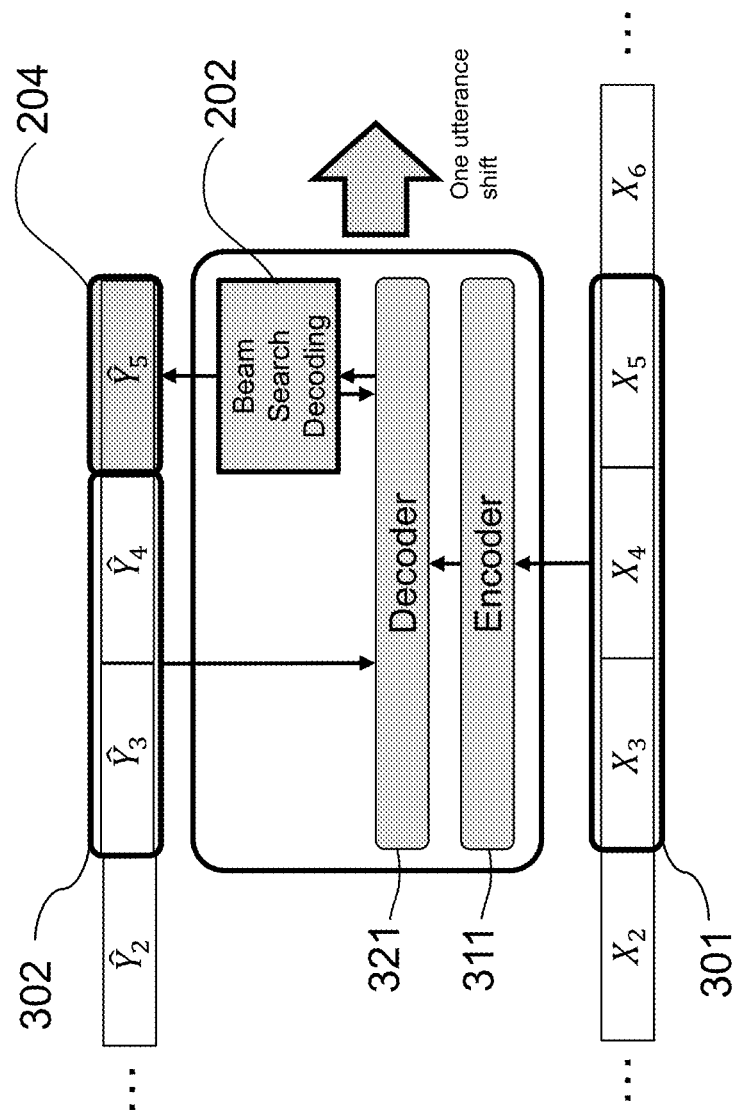

FIGS. 6A, 6B, and 6C are schematic diagrams illustrating some steps of the long-context end-to-end ASR system with a context-expanded Transformer, according to embodiments of the present invention.

In FIG. 6A, the system recognizes speech segment $X_{1:1}$ including only the first utterance $X_1$ without relying on previous context, and outputs the first token sequence hypothesis $\hat{Y}_1$. In FIG. 6B, the system reads speech segment $X_{1:2}$ obtained in the speech-segment update module. Then the system recognizes $X_2$ conditioned on the previous speech context $X_1$ and text context $\hat{Y}_1$, and outputs the second token sequence hypothesis $\hat{Y}_2$. In this way, the system recognizes utterances along a long audio input. Due to the limitation of time and memory space, the speech-segment update module may reduce the segment size by truncating the oldest utterances in the segment if the speech segment length exceeds a pre-defined threshold $\Gamma$. When truncating the speech segment, the corresponding text segment may also be truncated. FIG. 6C shows an example, in which the system recognizes $X_5$ to obtain $\hat{Y}_5$ for given speech segment $X_{3:5}$ and text segment $\hat{Y}_{3:4}$.

In some embodiments of the present invention, we also consider various ways to construct the speech and text segments. Typically, only a single speaker is included in each segment of lecture speech. However, different speakers can be included in the segment of conversational speech. In speech segment $X_{3:5}$ of FIG. 6C, $X_3$ can be spoken by speaker A, $X_4$ by speaker B, and $X_5$ by speaker C. With our approach, speech features from different speakers may have a negative impact on the Transformer in terms of speaker adaptation. To avoid this kind of segments (with the negative impact), we propose to make each segment with only a single speaker. For example, if $X_1$, $X_3$, and $X_5$ are spoken by the same speaker, the input segment is constructed as ($X_1$, $X_3$, $X_5$) to recognize $X_5$. The output context can also be made as ($\hat{Y}_1$, $\hat{Y}_3$), or just ($\hat{Y}_3$, $\hat{Y}_4$) based on the original manner to avoid disconnecting the conversation context. Depending on whether speaker information is used or not, we refer to these input and output contexts as speaker-dependent (SD) context and speaker-independent (SI) context, respectively. The same manner is also applied in the training phase.

To construct SD segments, we need to know the speaker id of each utterance. This is one limitation of the SD approach, but we can typically obtain each speaker's utterances from a channel associated with the speaker in telephone conversations or in meetings recorded by worn microphones. Speaker diarization techniques are also available to identify speakers when they are recorded with distant microphones.

Training Procedure

In the context-expanded Transformer 300, the model parameters are optimized to minimize the Transformer loss $$\mathcal{L}(X, Y, \Theta) = \sum_{q=1}^{Q} \sum_{u=1}^{U_q} -\log p(Y_u^{(q)} | Y_{v_u:u-1}^{(q)}, X_{v_u:u}^{(q)}; \Theta), \tag{20}$$

where X and Y are training data including speech segments and text segments, i.e., $(X_{v_u:u}^{(q)}, Y_{v_u:u}^{(q)}) \in (X, Y)$, $Q$ is the number of long-audio recordings in the training data, and $U_q$ is the number of utterances (or segments) in the q-th audio recording. $v_u$ is an utterance index representing a start position of the u-th segment, which is decided based on the speech segment length and threshold $\Gamma$.

$\Theta$ denotes a set of model parameters for a Conv2D, self-attention networks, layer normalization, and feed forward networks in the encoder 311, and a token embedding network, self-attention networks, source attention networks, layer normalization, a linear network in the decoder 321.

The set of network parameters $\Theta$ may be optimized by a stochastic gradient descent method, in which each element of the parameter set $\Theta$ is repeatedly updated as $$\Theta \leftarrow \Theta - \eta \frac{\partial}{\partial \Theta} \mathcal{L}(X, Y, \Theta), \tag{21}$$

until $\mathcal{L}(X, Y, \Theta)$ converges, where $\eta$ is a learning rate.

It is also possible to split X and Y into M small subsets $\{\mathbb{X}_m, \mathbb{Y}_m\}_{m=1,\ldots,M}$ such that $X = \mathbb{X}_1 \cup \ldots \cup \mathbb{X}_M$ and $Y = \mathbb{Y}_1 \cup \ldots \cup \mathbb{Y}_M$, and update the parameters by repeating $$\Theta \leftarrow \Theta - \eta \frac{\partial}{\partial \Theta} \mathcal{L}(\mathbb{X}_m, \mathbb{Y}_m, \Theta), \tag{22}$$

for m=1, . . . , M. By updating the parameters with the small subsets, the parameters are updated more frequently and the loss function converges more quickly.

In some embodiments of the present invention, a connectionist temporal classification (CTC) loss may also be used for training and decoding to improve the recognition accuracy. The CTC sequence probability can be computed as $$P_{ctc}(Y_u|X_{v:u}) = CTC(\text{Softmax}(\text{Linear}(H_u^{N_{enc}})), Y_u), \tag{23}$$

where CTC(P, Y) is an operation that marginalizes the posterior probabilities over all possible alignments between P and Y using the forward-backward algorithm.

For training, CTC loss can be added to the Transformer loss in Eq. (20) as $$\mathcal{L}(X, Y, \Theta) = \sum_{q=1}^{Q} \sum_{u=1}^{U_q} -(\lambda \log p(Y_u^{(q)} | Y_{v_u:u-1}^{(q)}, X_{v_u:u}^{(q)}, \Theta) + \tag{24}$$

$$(1-\lambda) \log p_{ctc}(Y_u^{(q)} | X_{v:u}^{(q)}; \Theta)),$$

where λ is a scaling factor to balance the Transformer and CTC losses, and Θ includes parameters of the linear transform for CTC in Eq. (23), which are jointly optimized with those of the context-expanded Transformer.

EVALUATION

Several experiments have been conducted using monologue benchmarks on CSJ [1] and TED-LIUM3 [2] corpora and dialogue benchmarks on SWITCHBOARD [3] and HKUST [4] corpora.
[1] K. Maekawa, H. Koiso, S. Furui, and H. Isahara, "Spontaneousspeech corpus of Japanese," in Proc. LREC, vol. 2,2000, pp. 947-952.
[2] F. Hernandez, V. Nguyen, S. Ghannay, N. Tomashenko, Y. Esteve, O. Jokisch, and R. Potapova, "TED-LIUM 3: Twice as much dataand corpus repartition for experiments on speaker adaptation," in Speech and Computer, 2018, pp. 198-208.
[3] J. Godfrey, E. Holliman, and J. McDaniel, "SWITCHBOARD: telephone speech corpus for research and development," in Proc. IEEE ICASSP, vol. 1,1992, pp. 517-520.
[4] Y. Liu, P. Fung, Y. Yang, C. Cieri, S. Huang, and D. Graff, "HKUST/MTS: A very large scale mandarin telephone speechcorpus," in Chinese Spoken Language Processing. Springer, 2006, pp. 724-735.

Eighty-dimensional log mel-filter bank acoustic features plus three-dimensional pitch features ($d_a$=83) were extracted from speech data in the corpora. Basically, hidden vectors in the encoder and the decoder had 256 dimensions ($d_h$=256). The encoder had one Conv2D module followed by 12 encoder blocks ($N_{enc}$=12). The Conv2D included a 2-layer 2D convolutions with 256 channels (C=256), a kernel size of 3×3 ($K_t$=$K_f$=3), a stride of size 2 ($s_t$=$s_f$=2), and ReLU activation, which outputs a 256-dimensional hidden vector sequence with the reduced sequence length by a factor of 4. Multi-head attention with 4 heads (M=4) of 64 dimensions were employed ($d_k$=$d_v$=64). The feed-forward network had one hidden layer with 2,048 units and ReLU non-linearity. The decoder had a token embedding layer followed by 6 decoder blocks ($N_{dec}$=6). The self-attention, source attention, and feed forward layers in the decoder had the same dimensions as those in the encoder, i.e., $d_e$=$d_d$=256. The output dimension was dependent on the number of unique tokens in the task. There were 3,260 characters in CSJ, 652 word pieces in TED-LIUM3, 1,996 word pieces in SWITCHBOARD, and 3,653 characters in HKUST. All models were trained using the end-to-end speech processing toolkit ESPnet. We generally followed the default configuration of each task in ESPnet recipes, where speed perturbation was applied for all the data sets we used, but SpecAugment was applied only for TED-LIUM3 and SWITCHBOARD. Baseline Transformers (prior art) were trained with independent utterances without context. Furthermore, i-vector-based speaker adaptation was also tested for comparison, where a speaker i-vector is concatenated to each frame vector right before the first encoder block. To train Transformers with the proposed method, each utterance was extended to a segment by concatenating it with previous utterances, where we set the segment length threshold Γ to 2000, which corresponds to 20 seconds since the acoustic feature vectors were extracted with a 10 mili-second period.

Finally, the parameters of top 5 models based on validation loss were averaged to obtain the final model for recognition. LSTM-based RNN language models were also trained using transcripts for CSJ and HKUST, and external text data for TED-LIUM3. The transcripts were concatenated in the same manner as in the context-expanded Transformer training. No LM was used for SWITCHBOARD. ASR performance is measured by character error rate (CER) or word error rate (WER).

FIG. 7A shows monologue ASR results on CSJ and TED-LIUM3 data sets. For every data set, the proposed approach significantly reduces ASR errors from the baseline, where the relative error rate reduction ranges from 5 to 15%. The i-vector approach did not consistently reduce the error rate. FIG. 7B shows dialogue ASR results on SWITCHBOARD and HKUST data sets.

For every data set, the proposed approach significantly reduces ASR errors from the baseline, especially with SD context, where the relative error rate reduction ranges from 7 to 13.5%. We also confirm that SD context is better than SI context in dialogue ASR.

The embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. An end-to-end automatic speech recognition (ASR) system comprising:
  an interface configured to acquire acoustic feature sequence including utterances;
  a memory configured to store computer-executable ASR program modules including a context-expanded transformer network including an encoder network and a decoder network, a beam search decoder and a speech-segment update module;
  a processor, in connection with the memory, configured to repeatedly decode the utterances by performing steps of:
  arranging speech and text segments using the acoustic feature sequence and a token sequence provided from the beam search decoder;
  updating, by the speech-segment update module, the speech segment by appending the acoustic feature sequence to a last of the speech segment and updating the text segment by appending a token sequence of the recognition result for a previous utterance to a last of the text segment;
  receiving, by the encoder network of the context-expanded transformer network, the updated speech segment including the added acoustic feature sequence, and receiving the updated text segment including the added token sequence and a partial token sequence from the beam search decoder by the decoder network of the context-expanded transformer network, wherein the decoder network includes a self-attention block configured to obtain each hidden vector over the utterances in the text segment to adapt to a topic of the text segment and a source attention block configured to accept the updated speech segment from the encoder network;

estimating token probabilities for the beam search decoder based on the updated speech segment and updated text segment; and finding a most probable token sequence as a speech recognition result from the estimated token probabilities using the beam search decoder.

2. The ASR system of claim 1, further comprising an output interface configured to generate text data according to the most probable token sequence.

3. The system of claim 1, wherein the processor is configured to stop decoding when no more acoustic feature sequence is provided.

4. The system of claim 1, wherein the processor is configured to detect when each of the utterances includes a speaker-dependent (SD) context.

5. The system of claim 1, wherein the SD context is determined by a speaker identify data (ID).

6. The system of claim 5, wherein the speaker ID determined by a channel associated with a recording device storing the utterances of the speaker or a microphone arranged to the speaker.

7. The system of claim 1, wherein the updating the speech segment is performed by appending the acoustic feature sequence, wherein the updating text segment(s) is performed by appending a token sequence of the recognition result for a previous utterance to a last of the text segment.

8. The system of claim 1, wherein the text segment is an empty sequence at an initial stage.

9. The system of claim 1, wherein each of the encoder and decoder networks includes a deep feed-forward architecture having repeated blocks of self-attention and feed-forward layers.

10. The system of claim 9, wherein the decoder network features a source attention layer in each of the repeated blocks to read the output from the encoder.

11. The system of claim 1, wherein the self-attention and source attention mechanisms utilize interdependence between the input frames and the output tokens.

12. The system of claim 1, wherein the transformer is configured to accept multiple utterances at once and predict output tokens for a last utterance using previous utterances.

13. The system of claim 1, wherein the segment size is determined by truncating oldest utterances in the segment if a segment duration exceeds a pre-defined constant length.

14. The system of claim 13, wherein when an input segment is truncated, an output context corresponding to the input segment is truncated.

15. The system of claim 1, wherein the transformer includes self-attention, source attention and feed forward layers in the decoder.

16. An end-to-end automatic speech recognition method comprising:

acquiring acoustic feature sequence including utterances;

arranging speech and text segments using the acoustic feature sequence and a token sequence provided from the beam search decoder;

updating, by the speech-segment update module, the speech segment by appending the acoustic feature sequence to a last of the speech segment and updating the text segment by appending a token sequence of the recognition result for a previous utterance to a last of the text segment;

receiving, by the encoder network of the context-expanded transformer network, the updated speech segment including the added acoustic feature sequence, and receiving the updated text segment including the added token sequence and a partial token sequence from the beam search decoder by the decoder network of the context-expanded transformer network wherein the decoder network includes a self-attention block configured to obtain each hidden vector over the utterances in the text segment to adapt to a topic of the text segment and a source attention block configured to accept the updated speech segment from the encoder network;

estimating token probabilities for the beam search decoder based on the updated speech segment and updated text segment;

finding a most probable token sequence as a speech recognition result from the estimated token probabilities using the beam search decoder; and generating text data based on the most probable token sequence.

17. The method of claim 16, further comprises a step of finishing decoding when no more acoustic feature sequence is provided.

18. The method of claim 16, further comprising a step of detecting if each of the utterances includes a speaker-dependent (SD) context.

19. A non-transitory computer readable medium that comprises program instructions that causes a computer to perform a method comprising:

acquiring acoustic feature sequence including utterances;

arranging speech and text segments using the acoustic feature sequence and a token sequence provided from the beam search decoder;

updating, by the speech-segment update module, the speech segment by appending the acoustic feature sequence to a last of the speech segment and updating the text segment by appending a token sequence of the recognition result for a previous utterance to a last of the text segment;

receiving, by the encoder network of the context-expanded transformer network, the updated speech segment including the added acoustic feature sequence, and receiving the updated text segment including the added token sequence and a partial token sequence from the beam search decoder by the decoder network of the context-expanded transformer network wherein the decoder network includes a self-attention block configured to obtain each hidden vector over the utterances in the text segment to adapt to a topic of the text segment and a source attention block configured to accept the updated speech segment from the encoder network;

estimating token probabilities for the beam search decoder based on the updated speech segment and updated text segment;

finding a most probable token sequence as a speech recognition result from the estimated token probabilities using the beam search decoder; and generating text data based on the most probable token sequence.

\* \* \* \* \*